(12) United States Patent
Yao et al.

(10) Patent No.: US 8,327,415 B2
(45) Date of Patent: Dec. 4, 2012

(54) ENABLING BYTE-CODE BASED IMAGE ISOLATION

(75) Inventors: Jiewen Yao, Shanghai (CN); Liang Cui, Shanghai (CN); Qin Long, Shangahai (CN); Vincent J. Zimmer, Federal Way (CN)

(73) Assignee: Intel Corporation, Santa Clara, CA (US)

( * ) Notice: Subject to any disclaimer, the term of this patent is extended or adjusted under 35 U.S.C. 154(b) by 1178 days.

(21) Appl. No.: 12/156,223

(22) Filed: May 30, 2008

(65) Prior Publication Data
US 2009/0300370 A1    Dec. 3, 2009

(51) Int. Cl.
*G06F 21/00* (2006.01)
(52) U.S. Cl. ............................................. 726/1; 713/193
(58) Field of Classification Search ...................... 726/1
See application file for complete search history.

(56) References Cited

U.S. PATENT DOCUMENTS

| | | | |
|---|---|---|---|
| 7,103,529 | B2 | 9/2006 | Zimmer .......................... 703/27 |
| 2003/0097581 | A1* | 5/2003 | Zimmer ........................ 713/200 |
| 2003/0188173 | A1* | 10/2003 | Zimmer et al. ............... 713/189 |
| 2004/0103299 | A1* | 5/2004 | Zimmer et al. ............... 713/200 |
| 2004/0268107 | A1* | 12/2004 | Zimmer et al. ................... 713/1 |
| 2007/0067590 | A1* | 3/2007 | Savagaonkar et al. ......... 711/163 |
| 2008/0120499 | A1 | 5/2008 | Zimmer et al. .................. 713/2 |

OTHER PUBLICATIONS

J. Butler and S. Sparks, "Windows rootkits of 2005, part two", security Focus, Nov. 2005.*
U.S. Appl. No. 11/897,355, filed Aug. 30, 2007, entitled "Method for Firmware Isolation," by Jiewen Yao, et al.

* cited by examiner

*Primary Examiner* — Kim Vu
*Assistant Examiner* — Yogesh Paliwal
(74) *Attorney, Agent, or Firm* — Trop, Pruner & Hu, P.C.

(57) ABSTRACT

In one embodiment, the present invention includes a method for setting an extensible policy mechanism to protect a root data structure including a page table, interpreting a bytecode of a pre-boot driver in a byte code interpreter, and controlling access to a memory location based on the extensible policy mechanism. Other embodiments are described and claimed.

16 Claims, 5 Drawing Sheets

ENABLING BYTE-CODE BASED IMAGE ISOLATION

BACKGROUND

In many computer systems, a booting of the system occurs through a series of steps in which initialization is performed, self-testing occurs, a basic input/output system (BIOS) is loaded and executed, and finally control may be passed off to an operating system (OS).

In many systems, trusted code, such as code present in a non-volatile storage of the system provided by an original equipment manufacturer (OEM), operates in the same privilege level as third party code. Accordingly, there is a risk that untrusted or errant third party code can corrupt the system, particularly in a pre-boot environment. As one example, so-called Unified Extensible Firmware Interface (UEFI) code in accordance with the UEFI Specification Version 2.0 (dated Feb. 21, 2006) calls for the separation of pre-boot and boot environments into a variety of phases. However, in these phases both OEM trusted code and third party untrusted/errant code can execute in the same privilege level.

Firmware-based security features, such as cryptographic loading and checking of UEFI-based platform code application signatures using digital signature technology like Authenticode, can only be guaranteed to operate as designed in the field if the implementation of the codes is isolated from untrusted content. To date, pre-OS isolation has been effected via ad hoc, incomplete mechanisms like system management mode (SMM), but in a world where SMM may not be available, or to meet the cross-architecture requirements of UEFI, other solutions are needed.

DETAILED DESCRIPTION

Embodiments may use software agents such as a software virtual machine (VM) in order to isolate various UEFI devices. For example, UEFI drivers, specifically drivers compiled to the EFI Byte Code (EBC) machine type, can be isolated from other drivers and the UEFI implementation itself, i.e., the UEFI Platform Initialization (PI) Architecture Driver Execution Environment (DXE) components (DXE isolation). This inter-driver and core-driver isolation will allow for the deployment of higher-assurance and more robust UEFI implementations.

Potential threats from a malicious or faulty EBC image can include various issues such as destruction or modification of data (integrity). The data can include the text sections of other drivers or the DXE core that implements the basic UEFI services. Other issues could cause other drivers to malfunction (availability), e.g., one driver corrupting another boot-driver, such as the disk block services, leaking of sensitive information outside (confidentiality) could occur, for example, during the use of EBC drivers for third party biometric support. Thus while a signature guarantees the origin of the EBC image, it does not guarantee that it is innocuous. Also, signature schemes are vulnerable to leaked or rogue signing keys getting into malicious code-author possession.

Embodiments may label EBC drivers as "trusted" or "untrusted". For trusted status, drivers will have full privilege. This includes proof-carrying code (e.g., image signature) and aligns with Authenticode/driver signing technology. For untrusted status, a driver may be provided with controlled access to system resources. Untrusted access can be mediated via a software isolation layer (e.g., an EBC VM). In one embodiment, a DXE EBC interpreter may check each pointer access against a memory map and a critical list of DXE code/data pages. This allows for data integrity such that no pointer forging is permitted. Further bounds checks are provided to enable code integrity such that no data-code conversions occurs, and no jumping into the middle of an application programming interface (API) function is allowed, and visibility modifiers can be prevented from access to private API or data.

In one embodiment, the EBC interpreter (EBC VM), including VM code, VM data, and VM stack can be protected. In addition the DXE core, including code (execute/read/authorized write) and data (read/authorized write) can be protected. Finally, known UEFI defined protocols (e.g., a peripheral component interconnect (PCI) input/output (IO), PCI_IO_Protocol stack, or a network stack protocol) can be protected.

Protection may be via memory access qualifiers by labeling the memory map with a security level, and checking each memory access operation, masking protected memory, and augmenting an instruction interpreter. In one embodiment, instructions to be protected can include: MOV/MOVI/MOVIn/MOVn/MOVREL/MOVsn, PUSH/PUSHn, POP/POPn. Call-outs from the EBC interpreter into native copy can also be qualified, such as BS to CopyMem, so that unguarded native code is not directed by a guarded EBC interpreter to provide errant behavior In addition to protection items described above, flexible protection may be performed via the following API (used internally and exposed to trusted images), as shown in Table 1. Specifically, the code shown in Table 1 may correspond to an execution policy protocol for an embodiment of the present invention in which an EBC driver or other EBC image may set an attribute policy for one or more data structures to be protected. Then during execution, this policy may be accessed. Depending on whether a given data structure requested to be accessed is protected and a corresponding protection level of the calling code, access to the protected data structure may or may not be allowed.

TABLE 1

```
typedef struct _EFI_EXECUTION_POLICY_PROTOCOL {
    EFI_EXECUTION_POLICY_SET_ATTRIBUTE      SetAttribute;
    EFI_EXECUTION_POLICY_GET_ACCESS_POLICY
    GetAccessPolicy;
    EFI_EXECUTION_POLICY_GET_CALLEX_POLICY
    GetCallexPolicy;
} EFI_EXECUTION_POLICY_PROTOCOL;
```

Figure 1:
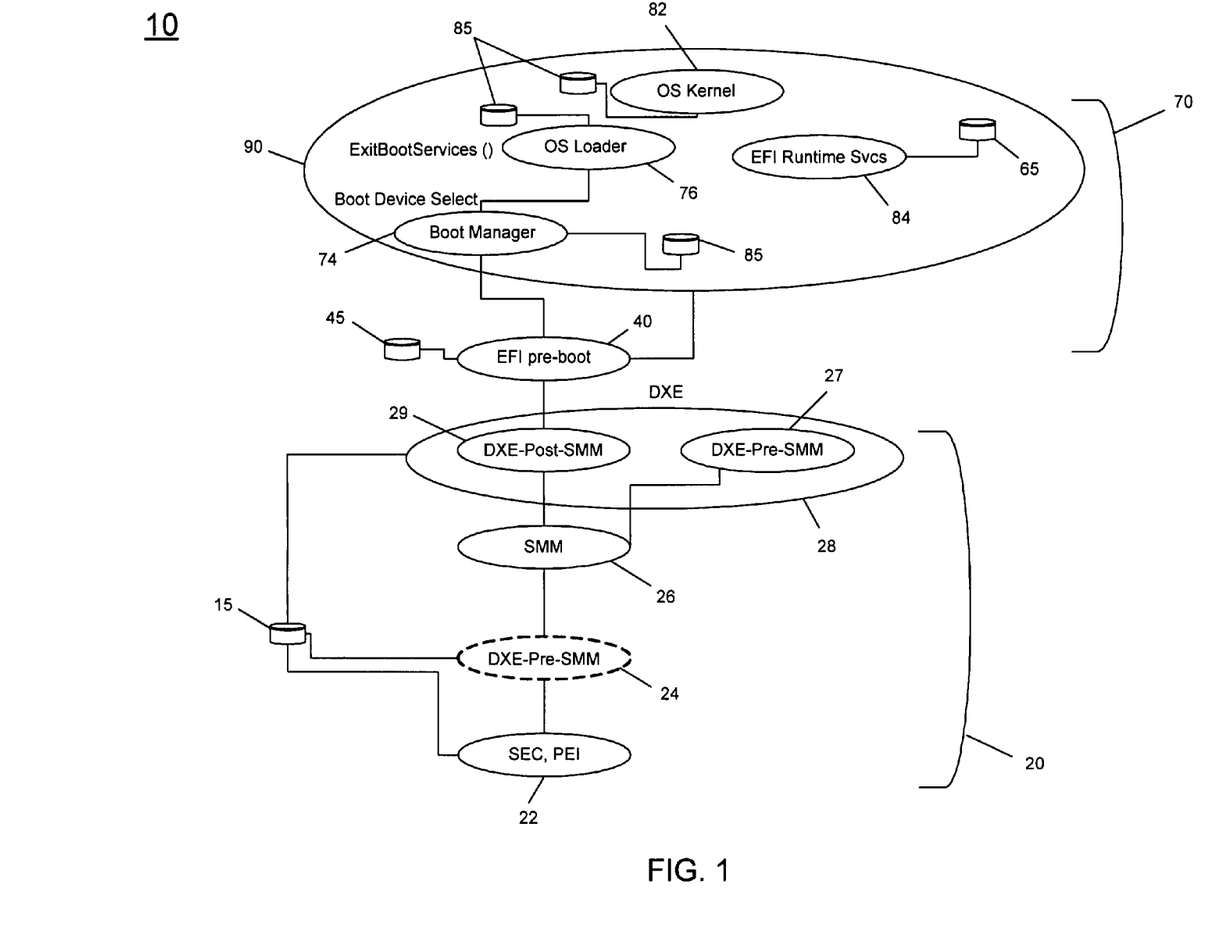
FIG. 1 is a system block diagram in accordance with an embodiment of the present invention.

Referring now to FIG. 1, shown is a system block diagram in accordance with an embodiment of the present invention. As shown in FIG. 1, system 10 includes a software model in which OEM extensible code 20 is isolated from third party extensible code 70. The isolation between these code domains is provided by an EFI pre-boot DXE 40 in accordance with an embodiment of the present invention. Namely this pre-OS DXE implementation of UEFI needs to be isolated from errant third party drivers. Also, certain pre-OS applications, such as the OS loader also needs to be protected from errant drivers.

As shown in FIG. 1, OEM extensible code 20 may include security and pre-EFI (SEC, PEI) phases 22 which may execute from code present in a non-volatile storage 15, such as platform flash storage. Further code stored in storage 15 may also implement a DXE phase 24, which hoists a SMM phase 26 into place and can include an EBC interpreter in accordance with one embodiment of the present invention. At the conclusion of SMM phase 26, it is locked. Still further, an additional DXE phase 28 may execute code. As shown in FIG. 1, DXE phase 28 may include both pre-SMM code 27 and post-SMM code 29. At this point, trusted ring 0 OEM SMM code has been executed, e.g., upon system power up or reset. Then, EFI pre-boot code 40 may be executed, and which may be stored in a storage 45, that includes EFI boot and runtime drivers, OS-absent applications, option read only memories (ROMs), a boot manager, among other such code, which is isolated from third party extensible code 70.

After such execution, as shown in FIG. 1 third party code 70 may execute. Such code may be located, e.g., in a mass storage device 85 such as disk storage. As shown in FIG. 1, third party code may include a boot manager 74 which may perform boot device selection, and an OS loader 76. Third party code 70 may further include an OS kernel 82 and EFI runtime services 84, in which EFI variables may be used to pass data down to other code executing within system 10. Note that the code modules present in third party extensible code 70, specifically boot manager 74, OS loader 76, OS kernel 82 and EFI runtime services 84 may execute in ring 0 privilege level. Thus all of these code modules may provide a post-EFI boot services compartment for execution in this privilege mode. Although not shown in FIG. 1, understand that various third party application codes may execute in ring 3 using the services in this compartment. While shown with this particular implementation in the embodiment of FIG. 1, the scope of the present invention is not limited in this regard.

If the UEFI EBC drivers are guest-hosted by the operating system, an embodiment can allow the OS EBC interpreter to provide these same protections. In this way, both on-the-metal pre-OS and under-the-OS-EFI-VM runtime can use an embodiment complementary fashion.

Referring now to Table 2, shown is, for example, pseudocode for initialization of an EBC driver in accordance with one embodiment of the present invention. Generally, this code shows that when an EBC driver is initialized, a call may be made to the execution policy protocol (via its globally unique identifier (GUID)) to request one or more data objects to be protected, i.e., by the SetAttribute( ) call. The EBC Execution Policy is a GUID for a driver that can be used to request that additional data objects be protected, and which thus acts as a database of protected data objects.

In the specific implementation shown in Table 2, this protected data structure is the system table that is a root data structure that is passed to various drivers or other code in a pre-boot environment. This initialization performed thus protects this system table that is later used by various APIs, such that the trusted drivers can identify data structures to be protected.

TABLE 2

```
(InitializeEbcDriver)
    Status = gBS->LocateProtocol (
        &gEfiExecutionPolicyProtocolGuid,
        NULL,
        &mEbcExecutionPolicy
        );
    if (!EFI_ERROR (Status)) {
    Status = mEbcExecutionPolicy->SetAttribute (
        mEbcExecutionPolicy,
        (EFI_PHYSICAL_ADDRESS)(UINTN)System
        Table,
        sizeof(*SystemTable),
        EFI_EXECUTION_POLICY_ATTRIB_WRITE_PROTECTED
        );
    Status = mEbcExecutionPolicy->SetAttribute (
        mEbcExecutionPolicy,
        (EFI_PHYSICAL_ADDRESS)(UINTN)System
        Table->RuntimeServices,
        sizeof(*(SystemTable->RuntimeServices)),
        EFI_EXECUTION_POLICY_ATTRIB_WRITE_PROTECTED
        );
}
```

Embodiments thus expose an API where a trusted driver can register additional data structures to be protected. In this way, an extensible protection registration mechanism can be used to enable a third party driver to be isolated from pre-boot code such as a DXE core (e.g., described above with regard to FIG. 1) and to enable the third party driver to protect certain data objects as well. For example, third party applications that are cryptographically signed (and thus are trusted to run) can register how to protect their own structures during execution. For example, OS loaders have pre-boot data structures that can be protected under a request to the DXE.

In addition, embodiments may provide code for use with an interpreter such as an EBC interpreter that interprets byte codes and generates native executables. Specifically, when such byte codes seek to access memory structures, the interpreter may cause code such as that shown in Table 3 below to be executed. In other words, the interpreter can be instrumented to call the database of what should be protected, and decide before interpreted byte codes are executed whether a policy to protect a data structure is to be enforced. If a driver was not signed, the unsigned driver may be prevented from making certain API calls or so forth.

TABLE 3

```
if (mEbcExecutionPolicy != NULL) {
    EFI_EXECUTION_POLICY_POLICY    Policy;
    Status = mEbcExecutionPolicy->GetAccessPolicy (
                mEbcExecutionPolicy,
                (EFI_PHYSICAL_ADDRESS)(UINTN)VmPtr->Ip,
                (EFI_PHYSICAL_ADDRESS)Addr,
                TRUE,
                &Policy
                );
    if (!EFI_ERROR (Status)) {
        if (Policy != EfiExecutionPolicyAllow) {
            return EFI_SUCCESS;
        }
    }
}
```

A policy enforcement mechanism is thus presented in firmware, i.e., a software virtual machine, and can be used to realize an extensible policy registration mechanism. As shown, such code may thus access the policy initialized for the EBC driver to determine whether the address region to be accessed corresponds to a protected memory structure. If a hypervisor is present, the protection information may be passed to it to handle page tables, otherwise the protection may be done in software. In other implementations, a first time run may be done in software, which can then inform a hypervisor that subsequent accesses are to be enforced in hardware.

Still further, embodiments may be used to insert code prior to a call to a function such that before the call is allowed, the memory structures are checked (e.g., by a software VM) to determine whether the call is allowed. One example implementation is shown in Table 4 below. Thus embodiments may provide for an extensible policy engine and instrumentation to an EBC byte code interpreter to provide protection to various data structures. For example, a call to an EBC interpreter may be instrumented as follows.

TABLE 4

```
if (mEbcExecutionPolicy != NULL) {
   EFI_EXECUTION_POLICY_POLICY     Policy;
   Status = mEbcExecutionPolicy->GetCallexPolicy (
            mEbcExecutionPolicy,
            (EFI_PHYSICAL_ADDRESS)(UINTN)VmPtr->Ip,
            (EFI_PHYSICAL_ADDRESS)FuncAddr,
            (EFI_PHYSICAL_ADDRESS)NewStackPointer,
            &Policy
            );
   if (!EFI_ERROR (Status)) {
      if (Policy != EfiExecutionPolicyAllow) {
         VmPtr->R[7] = EFI_SUCCESS;
         VmPtr->Ip += Size;
         return ;
      }
   }
}
```

In one embodiment, an implementation for a memory check using an EBC architecture with page table structures may be implemented using paging to enable memory read/write checks, although in a typical EBC architecture, there are no page level descriptions. A VM sees a "virtual address", and the EBC interpreter (i.e., a virtual machine monitor (VMM)) sees a "physical address." In one embodiment, various protection bits can be set by the EBC interpreter during initialization to indicate whether a page is writable or present for a specific VM. Later, these bits are checked by EBC interpreter. If the check passes, it means that the current VM has the right to access the memory. If not, that means that the current VM may be doing something harmful. Accordingly, the EBC interpreter can generate an exception. Note that the EBC interpreter can also use different page addresses (i.e., a non 1:1 mapping) to give mal-ware fake address for attacks, which can be helpful for system forensic analysis.

Thus embodiments can provide a policy engine in the EBC interpreter of the platform firmware such that the actions of the EBC driver are qualified and restricted from performing certain actions. In this way, UEFI implementations can isolate two classes of code (OEM and third party).

Figure 2:
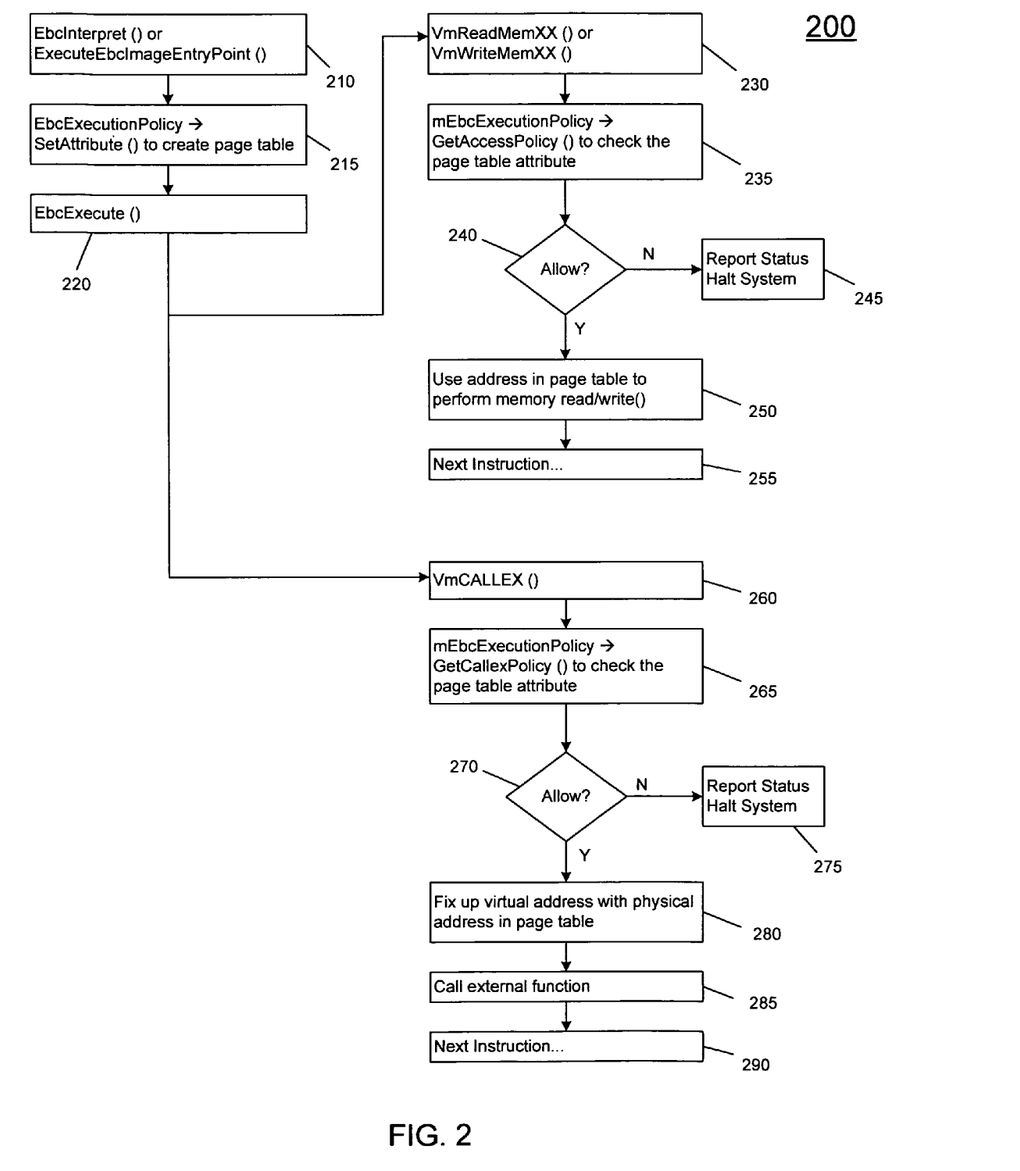
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to enable page table structures and control access thereto using an EBC architecture in accordance with one embodiment of the present invention. As shown in FIG. 2, method 200 may begin by initializing an EBC VM. Such initialization may begin with an EBCInterpret( ) function (block 210). Alternately, an ExecuteEBCImageEntryPoint( ) function may be performed. Then an EBC execution policy may be used to perform a SetAttribute( ) to create a page table (block 215). One example of such a page table can be seen in FIG. 3. Then the EBC may conclude its initialization by performing an EBCExecute( ) function (block 220). Control then passes either to block 230 or block 260.

More specifically, control passes to block 230 when a memory access instruction is encountered. Control passes from block 230 to block 235 where the EBC execution policy may be accessed to check the page table attributes for the corresponding memory location (block 235). In one embodiment, a GetAccessPolicy( ) function may be used to obtain this information. Next, the EBC interpreter may determine whether the access is allowed (diamond 240). For example, access control may be determined with respect to various protection bits of a page table entry. If the correct bits are set accordingly, the access may be allowed. Otherwise, the status may be reported and the system halted (block 245). If the access is allowed, control passes to block 250 where the address in the page table may be used to perform the memory read/write operation, after which other instructions may be performed (block 255).

Alternately control passes to block 260 (from block 220), where the VM may be called for execution, e.g., according to a VMCallEx( ) function. The extensible policy again may be checked to confirm whether the page table attribute for the desired operation is set accordingly (block 265). In one embodiment, a GetCallExPolicy( ) function may be used to check the page table attribute. Control then passes to diamond 270 to determine whether such access is to be allowed. If not, control passes to block 275, where the status may be reported and the system halted. If the access is allowed, control passes to block 280, where the virtual address as a parameter may be updated with a physical address in the page table, because an external function in the EFI environment will only recognize a physical address. Then, the EBC VM may call the external function (block 285). After return from the external function call, control then passes to block 290 for execution of further instructions. Note that if there is an address related parameter passed from the external function, the EBC interpreter will convert it from a physical address to a virtual address. While shown with this particular implementation in the embodiment of FIG. 2, the scope of the present invention is not limited in this regard. For example, note that method 200 may be combined with an EFI_execution_policy, as described above with respect to Table 1.

Thus embodiments may use isolation code in accordance with an embodiment to protect various page tables and other structures. For example, embodiments may be used to protect against corruption or hacking of a system table data, runtime services code table, among other malware attempts. In this way, protection of key entries in various systems tables such as an EFI systems table can be realized. Embodiments may further be used to strengthen firmware security features such as protected variables and driver signing, e.g., by UEFI code. In this way, errant third party driver code may be prevented from usurping UEFI services by avoiding patching of application programming interfaces (APIs) in the UEFI system table.

Figure 3:
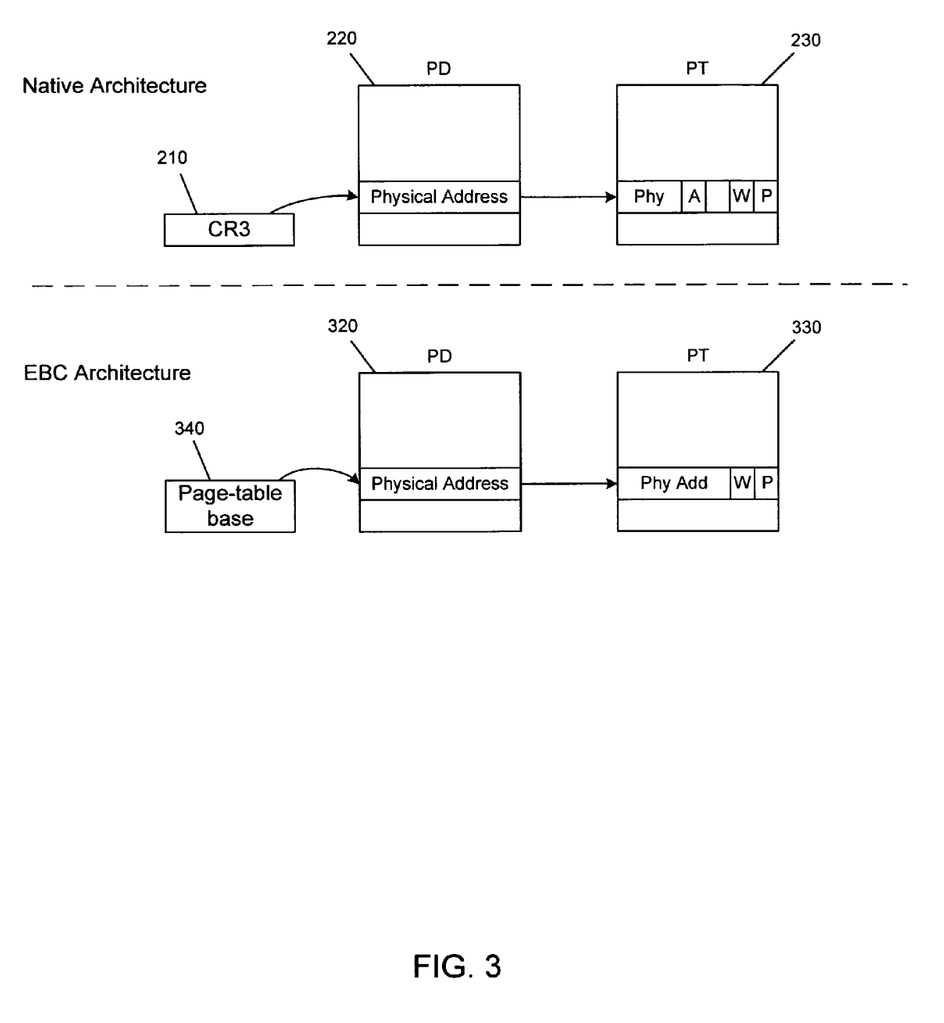
FIG. 3 is a block diagram of protection of page tables in accordance with an embodiment of the present invention.

Referring now to FIG. 3, shown is a block diagram of protection of page tables in accordance with an embodiment of the present invention. As shown in FIG. 3, paging mechanisms may be protected. While the scope of the present invention is not limited in this regard, in some embodiments 64-bit address translations may be protected, i.e., using a 4-level paging structure to access physical memory. For example in a native architecture a control register (i.e., control register 3) 210 may include a value that acts as a pointer to access a base of a value in a page directory (PD) 220. Each entry in PD 220 may correspond to a physical address which, in turn may be used to access a page table (PT) 230 which may correspond to a guest page table. As shown in FIG. 3, each entry within PT 230 may include a portion of a physical address, availability bits (e.g., bits 9:11), along with a write (W) bit and a present (P) bit, which may correspond to bits 0 and 1. Thus protection mechanisms may be provided in a guest, e.g., a guest OS or virtual machine (VM) that is controlled by a virtual machine monitor (VMM) or hypervisor (HV). Note that in such embodiments, W and P bits may be set by the HV. Still further, as shown in FIG. 3 in an EBC architecture, a page table base 340 may include a value to access an entry having a physical address within page directory 320 which in turn may be used to access an entry which includes a physical address in page table 330. Thus in the EBC architecture, an active page table may also have 1:1 mapping with read/write permissions (or non 1:1 mapping for forensic analysis). The availability bits, along with the W and P bits, may be set by the EBC interpreter during initialization, and then checked by the same during execution. As such the EBC interpreter can be used to determine whether requesting code can access the associated memory page.

Figure 4:
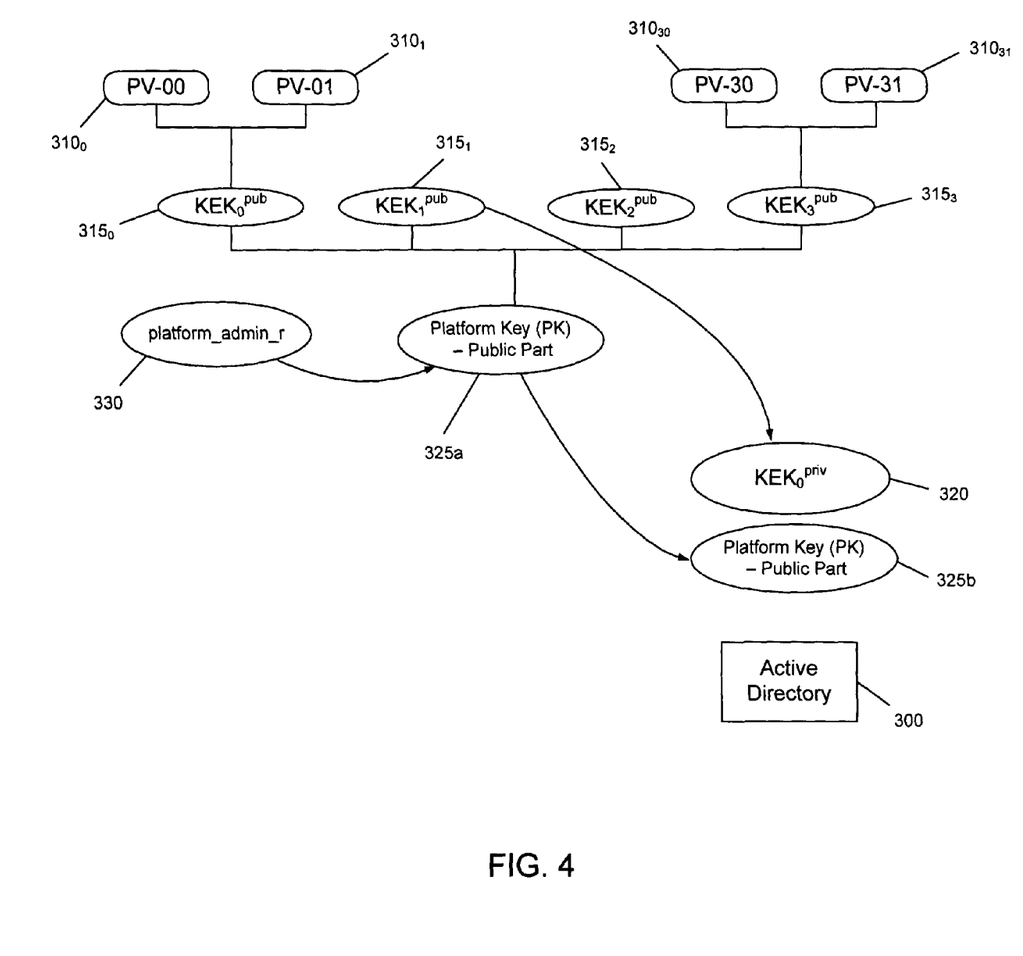
FIG. 4 is a block diagram of an implementation that can be used for code signing in addition to code isolation in accordance with an embodiment of the present invention.

Referring now to FIG. 4, shown is a block diagram of an implementation that can be used for code signing in addition to EBC isolation in accordance with an embodiment of the present invention. As shown in FIG. 4, system 300 includes an active directory. To enable access to multiple different OSs and other code, various key stores can be used for storage and verification of different software agents. Specifically, as shown in FIG. 4, key stores $310_0$-$310_{31}$ (generically key stores 310) may be used to provide a storage for verification of various software such as boot loaders, option ROMs, OS instantiations and so forth. In various implementations, each key store 310 may provide a per-OS protected variable. In turn, a plurality of public keys $315_0$-$315_3$ may be provided. Such keys may be per-OS keys that can be used in combination with a private key 320 to enable code signing in connection with a public and private part of a platform key $325_a$ and $325_b$, which can be reset and controlled by a platform administrator 330, which can reset the platform key by asserting physical presence and becoming a platform administrator. While shown with this particular implementation in the embodiment of FIG. 4, the scope of the present invention is not limited in this regard.

Figure 5:
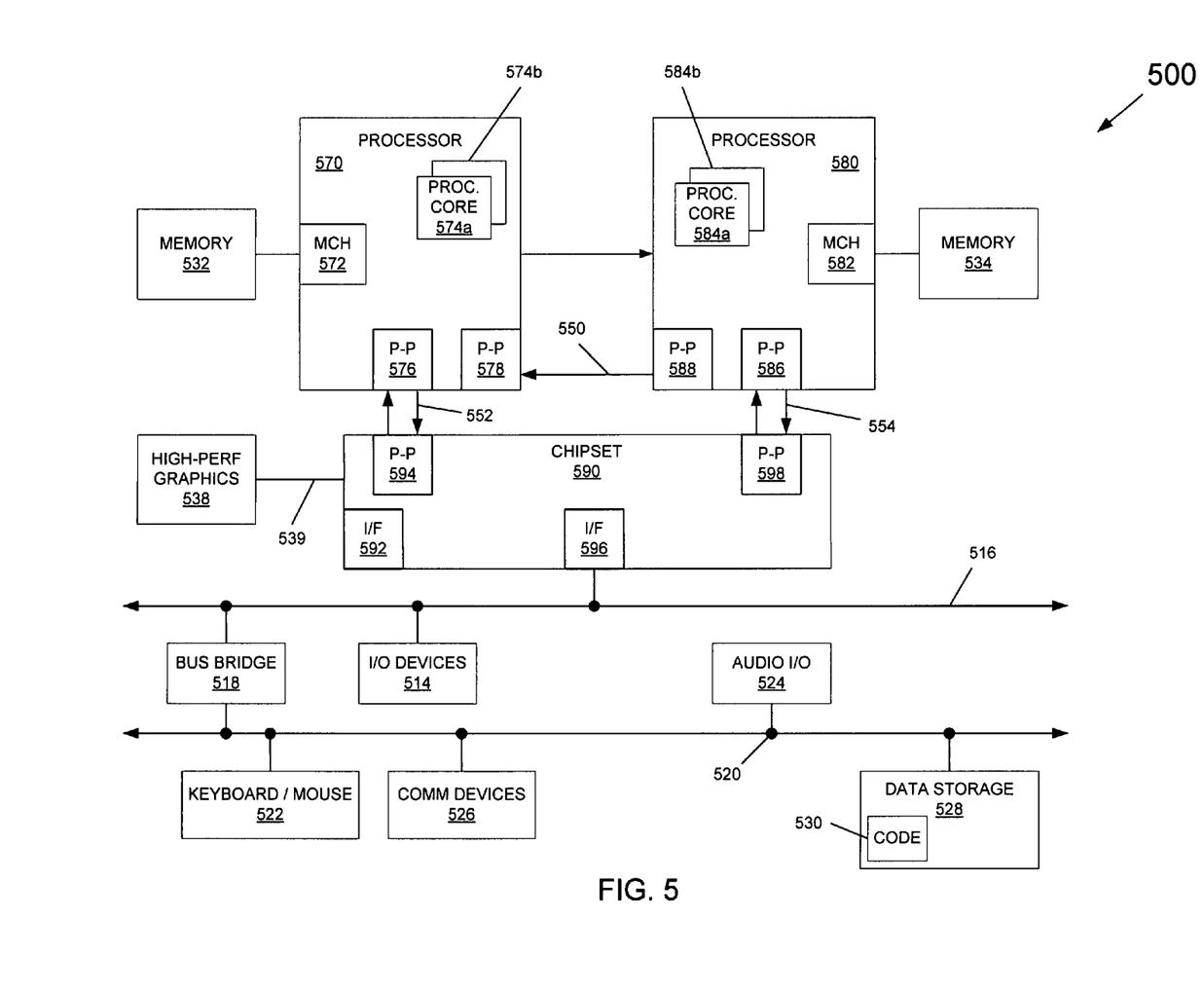
FIG. 5 is a block diagram of a multiprocessor system in which embodiments of the present invention may be implemented.

Embodiments may be suited for many different types of platforms. Referring now to FIG. 5, shown is a block diagram of a multiprocessor system in which embodiments of the present invention may be implemented. As shown in FIG. 5, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 5, each of processors 570 and 580 may be multi-core processors including first and second processor cores (i.e., processor cores 574a and 574b and processor cores 584a and 584b), although other cores and potentially many more other cores may be present in particular embodiments.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538 via a bus 539.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    initializing a bytecode driver and setting an extensible policy mechanism to protect at least one root data structure including a page table;
    during pre-boot, isolating a pre-boot driver from boot code;
    interpreting a bytecode of the pre-boot driver associated with a memory access in a byte code interpreter and mapping between a virtual address and a physical address of a memory page of the memory access, wherein the physical address is to be accessed using a page directory entry of a page directory and a page table entry of the page table; and
    controlling access to the memory page based on a plurality of protection bits of the page table entry of the page table;
    wherein the pre-boot driver and the boot code both operate at ring 0 privilege level.

2. The method of claim 1, further comprising setting the extensible policy mechanism to protect a data structure of the pre-boot driver responsive to a request of the pre-boot driver, wherein the pre-boot driver is cryptographically signed.

3. The method of claim 2, further comprising allocating the memory page to an exclusion list by writing a predetermined code in the plurality of protection bits of the associated page table entry.

4. The method of claim 3, further comprising preventing access to the memory page by code other than the pre-boot driver if the memory page is allocated in the exclusion list.

5. The method of claim 4, further comprising preventing access to the memory page by the pre-boot driver if the pre-boot driver is not cryptographically signed.

6. The method of claim 1, further comprising performing the mapping between the virtual address and the physical address with a non-1:1 mapping to provide a false address to malware.

7. An article comprising a non-transitory computer storage medium including instructions that when executed cause a system to:
 initialize a bytecode driver and set an extensible policy mechanism to protect at least one root data structure including a page table;
 during pre-boot, isolate a pre-boot driver from boot code;
 interpret a bytecode of the pre-boot driver associated with a memory access in a byte code interpreter and map between a virtual address and a physical address of a memory page of the memory access, wherein the physical address is to be accessed using a page directory entry of a page directory and a page table entry of the page table; and
 control access to the memory page based on a plurality of protection bits of the page table entry of the page table;
 wherein the pre-boot driver and the boot code are both to operate at ring 0 privilege level.

8. The article of claim 7, further comprising instructions that when executed enable the system to set the extensible policy mechanism to protect a data structure of the pre-boot driver responsive to a request of the pre-boot driver, wherein the pre-boot driver is cryptographically signed.

9. The article of claim 8, further comprising instructions that when executed enable the system to allocate the memory page to an exclusion list by writing a predetermined code in the plurality of protection bits of the associated page table entry.

10. The article of claim 9, further comprising instructions that when executed enable the system to prevent access to the memory page by code other than the pre-boot driver if the memory page is allocated in the exclusion list.

11. The article of claim 7, further comprising instructions that when executed enable the system to perform the mapping between the virtual address and the physical address with a non-1:1 mapping to provide a false address to malware.

12. The method of claim 1 including:
 during pre-boot, isolating OEM extensible code from third party extensible code based on the interpreter;
 wherein (a) the interpreter includes one of a virtual machine and virtual machine manager, and (b) the OEM extensible code and third party extensible code both operate at ring 0 privilege level.

13. The method of claim 1 including the interpreter setting the plurality of protection bits during initialization of the bytecode driver.

14. The method of claim 1 including:
 during pre-boot, isolating OEM extensible code from third party extensible code based on the interpreter;
 wherein the OEM extensible code and third party extensible code both operate at ring 0 privilege level.

15. The method of claim 1 including during pre-boot, isolating OEM extensible code from third party extensible code based on the interpreter.

16. The method of claim 1 including:
 during pre-boot, isolating first extensible code from second extensible code;
 wherein the first extensible code and the second extensible code both operate at ring 0 privilege level.

* * * * *